(12) United States Patent
Lin et al.

(10) Patent No.: US 9,383,623 B2
(45) Date of Patent: Jul. 5, 2016

(54) COLOR DISPLAY DEVICE

(71) Applicant: E Ink California, LLC, Fremont, CA (US)

(72) Inventors: Craig Lin, Oakland, CA (US); Hui Du, Milpitas, CA (US); Ming Wang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 14/921,265

(22) Filed: Oct. 23, 2015

(65) Prior Publication Data

US 2016/0041448 A1 Feb. 11, 2016

Related U.S. Application Data

(63) Continuation-in-part of application No. 14/279,173, filed on May 15, 2014, now Pat. No. 9,170,468.

(60) Provisional application No. 61/824,887, filed on May 17, 2013, provisional application No. 61/893,831, filed on Oct. 21, 2013, provisional application No. 61/974,858, filed on Apr. 3, 2014.

(51) Int. Cl.
*G02F 1/167* (2006.01)
*G02F 1/133* (2006.01)
*G02F 1/1333* (2006.01)

(52) U.S. Cl.
CPC ............ *G02F 1/167* (2013.01); *G02F 1/13306* (2013.01); *G02F 1/133348* (2013.01); *G02F 2001/1672* (2013.01); *G02F 2001/1676* (2013.01); *G02F 2001/1678* (2013.01); *G02F 2203/34* (2013.01)

(58) Field of Classification Search
CPC ........................................................ G02F 1/67
See application file for complete search history.

(56) References Cited

U.S. PATENT DOCUMENTS

| | | | |
|---|---|---|---|
| 6,693,621 B1 | 2/2004 | Hayakawa et al. |
| 6,781,745 B2 | 8/2004 | Chung et al. |
| 6,864,875 B2 | 3/2005 | Drzaic et al. |
| 6,930,818 B1 | 8/2005 | Liang et al. |
| 6,987,603 B2 | 1/2006 | Paolini et al. |
| 7,038,655 B2 | 5/2006 | Herb et al. |
| 7,046,228 B2 | 5/2006 | Liang et al. |
| 7,075,502 B1 | 7/2006 | Drzaic et al. |
| 7,116,467 B2 | 10/2006 | Kornbrekke et al. |

(Continued)

FOREIGN PATENT DOCUMENTS

| | | |
|---|---|---|
| JP | 2000-231126 | 8/2000 |
| JP | 2006-343458 | 12/2006 |

(Continued)

OTHER PUBLICATIONS

U.S. Appl. No. 14/794,689, filed Jul. 8, 2015, Chan et al.

(Continued)

*Primary Examiner* — Joseph P Martinez
(74) *Attorney, Agent, or Firm* — Perkins Coie LLP

(57) ABSTRACT

The present invention provides a color display device in which each pixel or sub-pixel can display four high quality color states. More specifically, an electrophoretic fluid is provided which comprises four types of particles, dispersed in a solvent or solvent mixture. The fluid may further comprise substantially uncharged neutral buoyancy particles.

20 Claims, 16 Drawing Sheets

(56) References Cited

U.S. PATENT DOCUMENTS

| | | |
|---|---|---|
| 7,292,386 B2 | 11/2007 | Kanbe |
| 7,312,916 B2 | 12/2007 | Pullen et al. |
| 7,345,810 B2 | 3/2008 | Chopra et al. |
| 7,433,113 B2 | 10/2008 | Chopra et al. |
| 7,609,435 B2 | 10/2009 | Moriyama et al. |
| 7,636,076 B2 | 12/2009 | Hung et al. |
| 7,652,656 B2 | 1/2010 | Chopra et al. |
| 7,656,576 B2 | 2/2010 | Suwabe et al. |
| 7,848,009 B2 | 12/2010 | Machida et al. |
| 7,933,062 B2 | 4/2011 | Masuzawa et al. |
| 8,040,594 B2 | 10/2011 | Paolini, Jr. et al. |
| 8,054,288 B2 | 11/2011 | Sugita et al. |
| 8,067,305 B2 | 11/2011 | Zafiropoulo et al. |
| 8,068,090 B2 | 11/2011 | Machida et al. |
| 8,081,375 B2 | 12/2011 | Komatsu et al. |
| 8,115,729 B2 | 2/2012 | Danner et al. |
| 8,174,491 B2 | 5/2012 | Machida et al. |
| 8,243,013 B1 | 8/2012 | Sprague et al. |
| 8,441,713 B2 | 5/2013 | Kawashima et al. |
| 8,441,714 B2 | 5/2013 | Paolini, Jr. et al. |
| 8,462,423 B2 | 6/2013 | Farrand et al. |
| 8,477,404 B2 | 7/2013 | Moriyama et al. |
| 8,477,405 B2 | 7/2013 | Ishii et al. |
| 8,491,767 B2 | 7/2013 | Gibson et al. |
| 8,520,296 B2 | 8/2013 | Wang et al. |
| 8,565,522 B2 | 10/2013 | Swic |
| 8,570,639 B2 | 10/2013 | Masuzawa et al. |
| 8,574,937 B2 | 11/2013 | Shi |
| 8,629,832 B2 | 1/2014 | Tanabe |
| 8,670,174 B2 | 3/2014 | Sprague et al. |
| 8,674,978 B2 | 3/2014 | Komatsu et al. |
| 8,687,265 B2 | 4/2014 | Ahn et al. |
| 8,704,754 B2 | 4/2014 | Machida et al. |
| 8,717,662 B2 | 5/2014 | Komatsu |
| 8,717,664 B2 | 5/2014 | Wang et al. |
| 8,902,491 B2 | 12/2014 | Wang et al. |
| 8,963,903 B2 | 2/2015 | Sakamoto et al. |
| 8,964,282 B2 | 2/2015 | Wang et al. |
| 8,988,764 B2 | 3/2015 | Abe et al. |
| 9,013,516 B2 | 4/2015 | Sakamoto et al. |
| 9,052,564 B2 | 6/2015 | Sprague et al. |
| 9,170,468 B2 | 10/2015 | Lin et al. |
| 2008/0042928 A1* | 2/2008 | Schlangen ............ G09C 3/3446 345/55 |
| 2008/0062159 A1 | 3/2008 | Roh et al. |
| 2008/0117165 A1 | 5/2008 | Machida et al. |
| 2008/0237550 A1 | 10/2008 | Yang et al. |
| 2011/0175939 A1 | 7/2011 | Moriyama et al. |
| 2011/0285713 A1 | 11/2011 | Swic et al. |
| 2012/0194899 A1 | 8/2012 | Zhang |
| 2012/0229885 A1 | 9/2012 | Chen et al. |
| 2012/0299947 A1 | 11/2012 | Tsuda et al. |
| 2013/0278995 A1 | 10/2013 | Drzaic et al. |
| 2013/0300727 A1 | 11/2013 | Lin et al. |
| 2014/0313566 A1 | 10/2014 | Du et al. |
| 2014/0340736 A1 | 11/2014 | Lin |
| 2014/0347407 A1 | 11/2014 | Wang et al. |
| 2015/0062690 A1 | 3/2015 | Wang et al. |
| 2015/0103394 A1 | 4/2015 | Wang et al. |
| 2015/0198858 A1 | 7/2015 | Chan et al. |
| 2015/0234250 A1 | 8/2015 | Lin et al. |

FOREIGN PATENT DOCUMENTS

| | | |
|---|---|---|
| JP | 2008-033000 | 2/2008 |
| JP | 2008-209589 | 9/2008 |
| JP | 2009-116041 | 5/2009 |
| JP | 2009-162637 | 8/2009 |
| JP | 2011-158783 | 8/2011 |
| KR | 10-2007-0082680 | 8/2007 |
| KR | 10-2008-0023913 | 3/2008 |
| KR | 10-2011-0103765 | 9/2011 |
| KR | 10-2011-0112329 | 10/2011 |
| KR | 10-1232146 | 2/2013 |
| TW | 201237529 | 9/2012 |
| WO | WO 95/19227 | 7/1995 |
| WO | WO 98/41899 | 9/1998 |

OTHER PUBLICATIONS

Kawaguchi et al., Synthesis of Polyethylene Macromonomers and Their Radical Copolymerizations with Methyl Methacrylate in Homogeneous and Oligoethylene Melts Media.,DesignedMonomers Polymers_vol. 3, No. 3,pp. 263-277(2000).

PCT/US2014/038229, PCT Notification of Transmittal of the International Search Report and the Written Opinion of the International Searching Authority, or the Declaration, mailed Nov. 7, 2014.

* cited by examiner

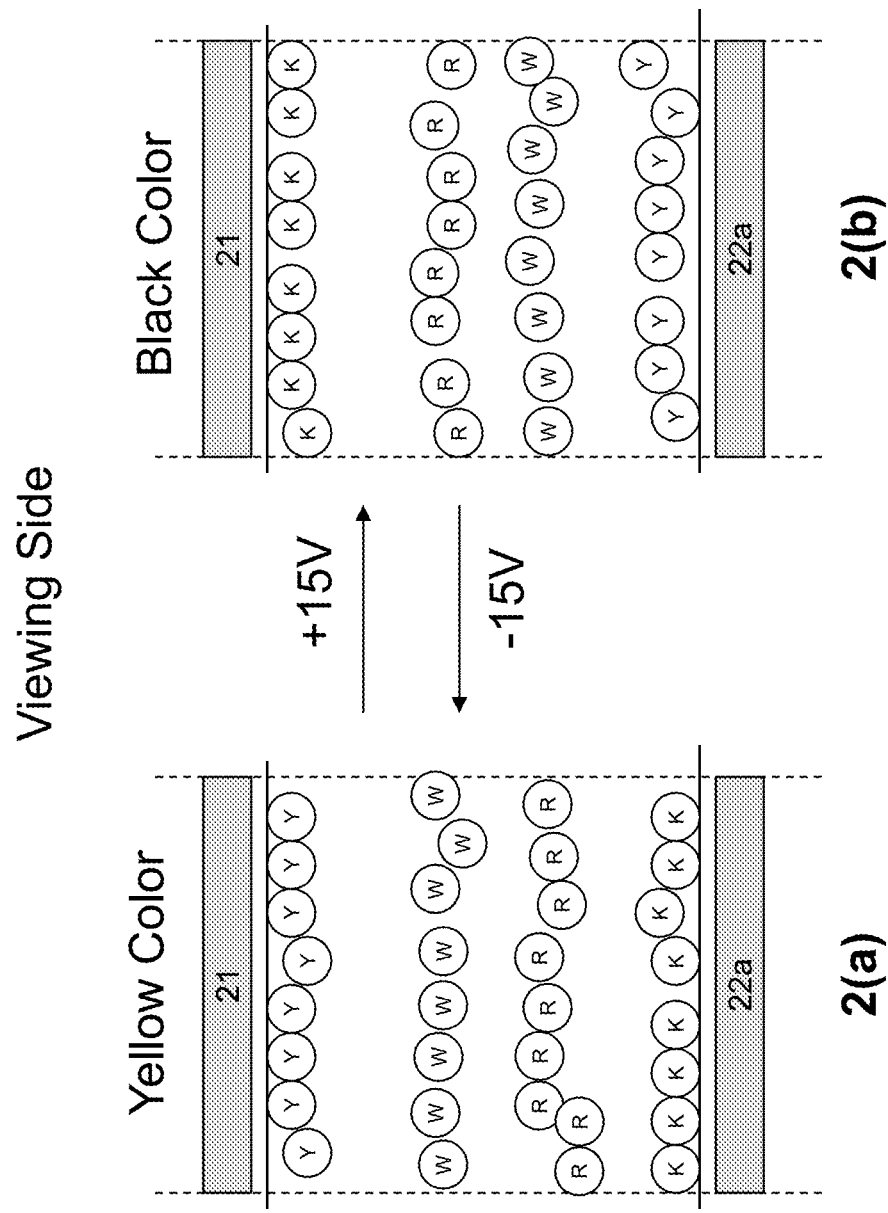

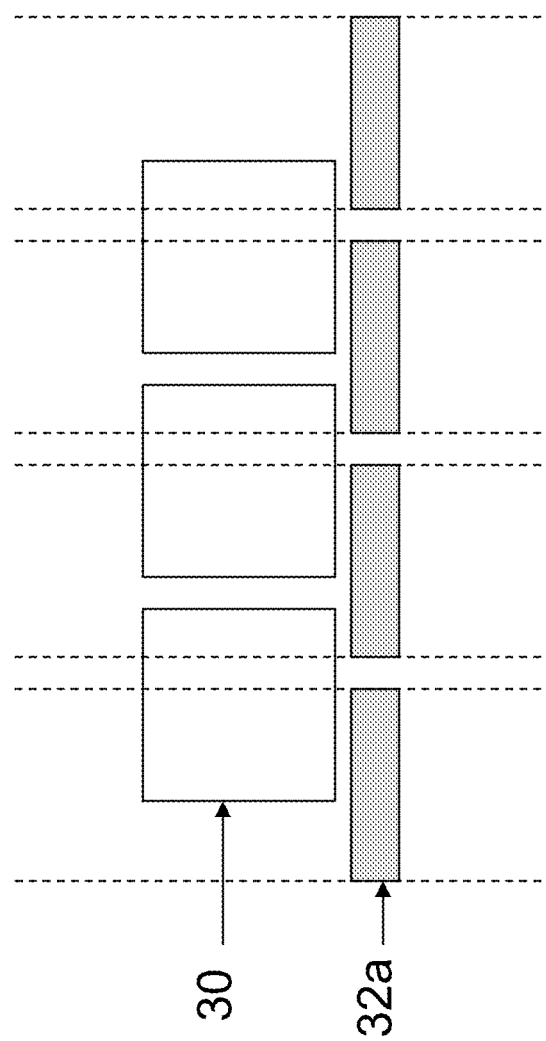

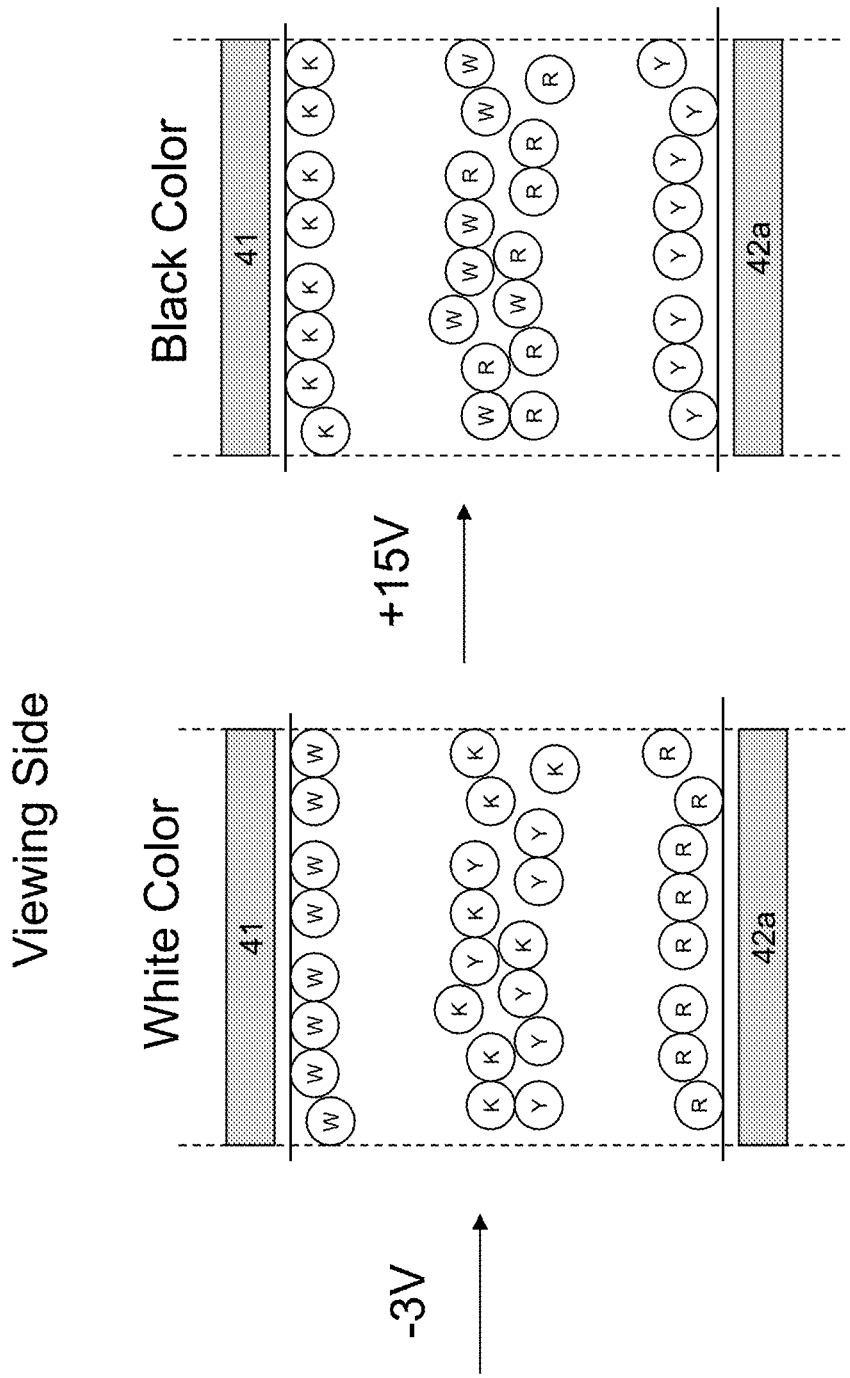

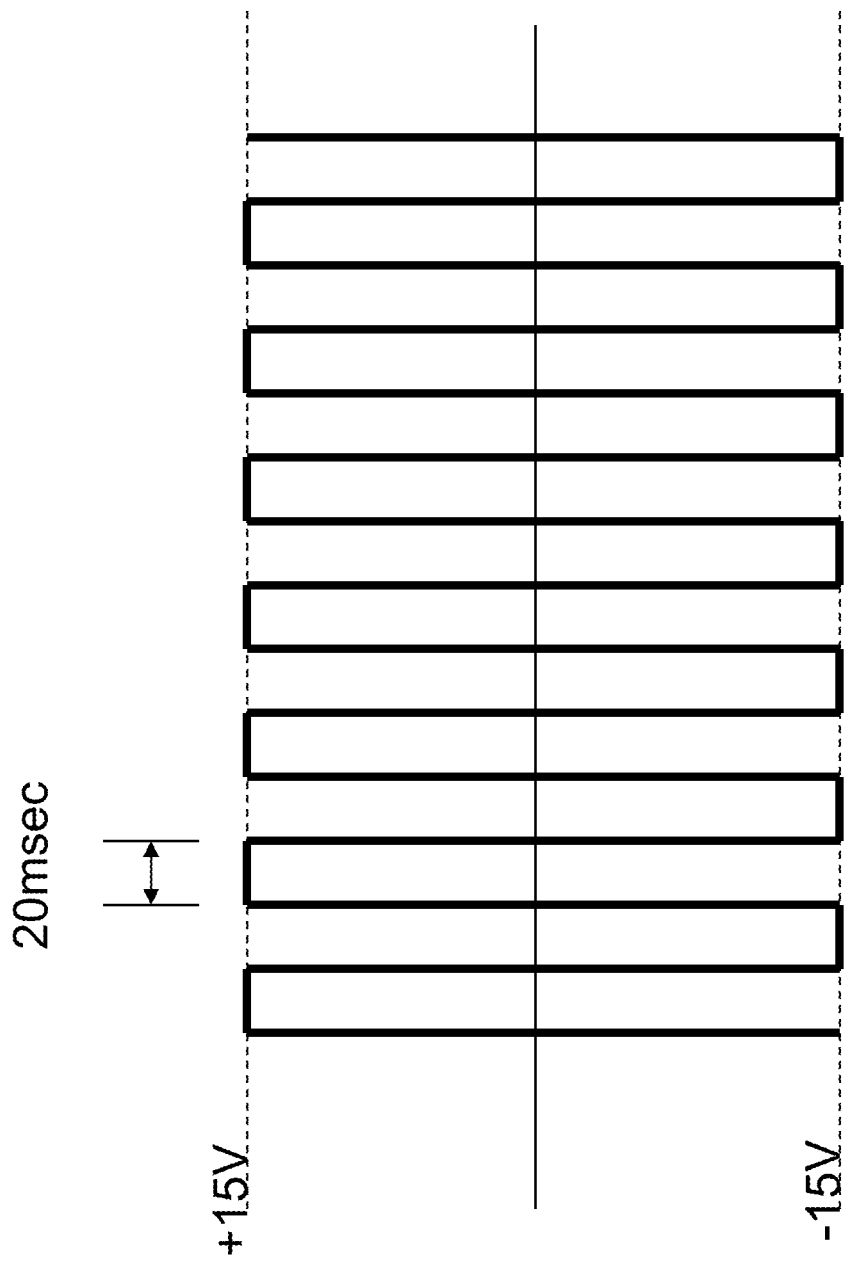

| Black | K | K | | White | W | W | | Red | R | K | | Blue | B | K |
|---|---|---|---|---|---|---|---|---|---|---|---|---|---|

(a) (b)

| Green | K | G | | Magenta | K | M | | Cyan | B | G | | Yellow | R | G |
|---|---|---|---|---|---|---|---|---|---|---|---|---|---|

Figure 8B

COLOR DISPLAY DEVICE

This is a continuation-in-part application of U.S. application Ser. No. 14/279,173, filed May 15, 2014; which claims the benefit of U.S. Provisional Application Nos. 61/824,887, filed May 17, 2013; 61/893,831, filed Oct. 21, 2013; and 61/974,858, filed Apr. 3, 2014. The contents of the above-identified applications are incorporated herein by reference in their entirety.

FIELD OF THE INVENTION

The present invention is directed to a color display device in which each pixel or sub-pixel can display four high quality color states, an electrophoretic fluid for such an electrophoretic display and driving methods for such a display device.

BACKGROUND OF THE INVENTION

In order to achieve a color display, color filters are often used. The most common approach is to add color filters on top of three black/white sub-pixels of a pixellated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The disadvantage of such a technique is that the white state is fairly dim. To compensate it, a fourth sub-pixel may be added which can display only the black and white states. In this approach, the white level may be increased, but the increase in whiteness is at the expense of the red, green or blue color level (where each of the sub-pixels is only one fourth of the area of a pixel). In other words, a brighter white color can be achieved, but it is achieved at the expense of the other colors which will become light and unsaturated. Even with this approach, the white level is normally still substantially less than half of that of a black and white display, rendering it an unacceptable choice for display devices, such as e-readers or displays that need well readable black-white brightness and contrast.

SUMMARY OF THE INVENTION

One aspect of the present invention is directed to a display layer comprising an electrophoretic medium and having first and second surfaces on opposed sides thereof, the electrophoretic medium comprising a first type of positive particles, a first type of negative particles, a second type of positive particles and a second type of negative particles, all dispersed in a solvent or solvent mixture, the four type of particles having respectively optical characteristics differing from one another, such that:
  (a) application of an electric field which has the same polarity as the first type of positive particles will cause the optical characteristics of the first type of positive particles to be displayed at the first surface; or
  (b) application of an electric field which has the same polarity as the first type of negative particles will cause the optical characteristic of the first type of negative particles to be displayed at the first surface; or
  (c) once the optical characteristic of the first type of positive particles is displayed at the first surface, application of an electric field which has the same polarity as the second type of negative particles, but is not strong enough to overcome the attraction force between the first type of positive particles and the first type of negative particles, but sufficient to overcome the attraction forces between other oppositely charged particles will cause the optical characteristic of the second type of negative particles to be displayed at the first surface; or
  (d) once the optical characteristic of the first type of negative particles is displayed at the first surface, application of an electric field which has the same polarity as the second type of positive particles, but is not strong enough to overcome the attraction force between the first type of positive particles and the first type of negative particles, but sufficient to overcome the attraction forces between other oppositely charged particles will cause the optical characteristic of the second type of positive particles to be displayed at the first surface.

In one embodiment, the first type of positive particles is black particles, the first type of negative particles is yellow particles, the second type of positive particles is the red particles and the second type of negative particles is the white particles.

In one embodiment, the charges of the first type of positive particles and the first type of negative particles are higher than the second type of positive particles and the second type of negative particles.

In one embodiment, the charges of the lower charged particles are less than 50% of the charges of the higher charged particles. In one embodiment, the charges of the lower charged particles are 5% to 30% of the charges of the higher charged particles. In one embodiment, the charges of the lower charged particles are less than 75% of the charges of the higher charged particles. In one embodiment, the charges of the lower charged particles are 15% to 55% of the charges of the higher charged particles.

In one embodiment, the electrophoretic medium further comprising substantially uncharged neutral buoyancy particles. In one embodiment, the neutral buoyancy particles are non-charged.

Another aspect of the present invention is directed to a driving method for an electrophoretic fluid comprising four types of charged pigment particles dispersed in a solvent or solvent mixture, wherein the four types of charged pigment particles are high positive charged pigment particles, high negative charged pigment particles, low positive charged pigment particles and low negative charged particles, which method comprises
  (a) driving a pixel to the color state of one of the low charged particles; followed by
  (b) driving the pixel to the color state of high charged particles, wherein the low charged particles and the high charged particles carry opposite charge polarities.

In one embodiment, the method further comprises a shaking waveform.

In one embodiment of the driving method, the high positive charged particles are black. In another embodiment, the high negative charged particles are yellow. In a further embodiment, the low positive charged particles are red. In yet a further embodiment, the low negative charged particles are white.

A further aspect of the invention is directed to a driving method for an electrophoretic fluid comprising four types of charged pigment particles dispersed in a solvent or solvent mixture, wherein the four types of charged pigment particles are high positive charged pigment particles, high negative charged pigment particles, low positive charged pigment particles and low negative charged particles, which method comprises (a) applying a shaking waveform;
(b) applying a high driving voltage having the same polarity as one type of high charged pigment particles to drive to a color state of the high charged pigment particles;
(c) applying a low driving voltage having the same polarity as one type of low charged pigment particles to drive to a color state of low charged pigment particles; and
(d) applying a high driving voltage having the same polarity as the high charged pigment particles to drive to a color state of the high charged pigment particles;

wherein the high charged pigment particles and the low charged pigment particles are oppositely charged and the driving method is DC balanced.

In yet a further aspect of the invention is directed to an electrophoretic fluid comprising four types of charged pigment particles dispersed in a solvent or solvent mixture, wherein the four types of charged pigment particles are high positive charged pigment particles, high negative charged pigment particles, low positive charged pigment particles and low negative charged particles and the low charged particles have a charge intensity which is less than 75% of the charge intensity of the high charged particles.

In one embodiment, the low positive charged particles have a charge intensity which is less than 50% of the charge intensity of the high positive charged particles and the low negative charged particles have a charge intensity which is less than 75% of the charge intensity of the high negative charged particles.

In one embodiment, the fluid further comprises substantially uncharged neutral buoyancy particles, which may be non-charged.

BRIEF DESCRIPTION OF THE DRAWINGS

FIGS. 2-1 to 2-3 illustrate an example of the present invention.

FIG. 3 demonstrates display cells unaligned with pixel electrodes.

FIGS. 4A and 4B illustrate driving methods of the present invention.

FIG. 5 shows a shaking waveform which may be incorporated into driving sequences.

FIGS. 7A, 7B, 8A, 8B, 9A and 9B illustrate one aspect of the present invention wherein a pixel consists of two sub-pixels.

DETAILED DESCRIPTION OF THE INVENTION

The electrophoretic fluid of present invention comprises two pairs of oppositely charged particles. The first pair consists of a first type of positive particles and a first type of negative particles and the second pair consists of a second type of positive particles and a second type of negative particles.

In the two pairs of oppositely charged particles, one pair carries a charge higher than the other pair. Therefore the four types of particles may also be referred to as high positive particles, high negative particles, low positive particles and low negative particles.

Figure 1:
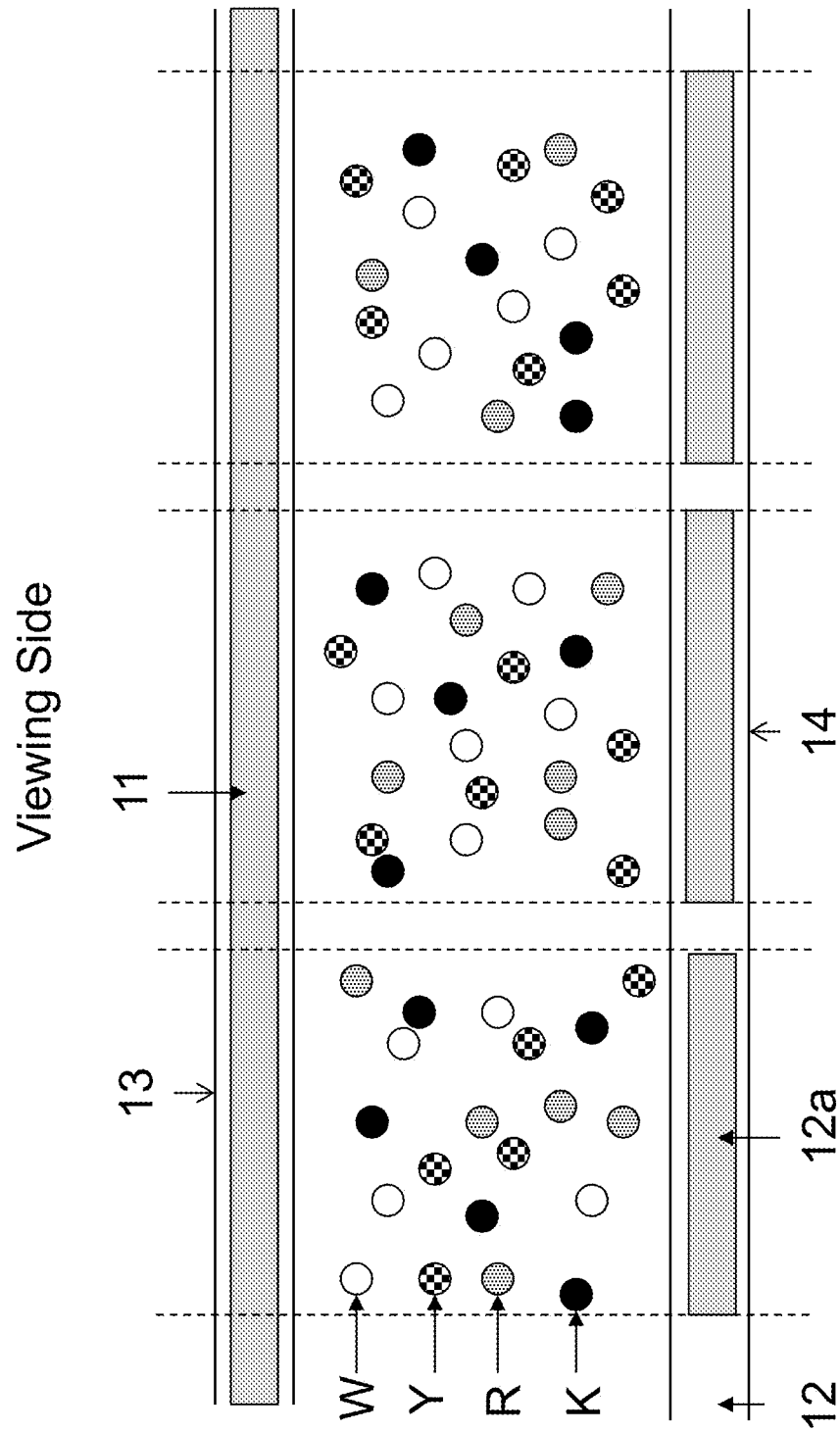
FIG. 1 depicts a display layer which can display four different color states.

As an example shown in FIG. 1, the black particles (K) and yellow particles (Y) are the first pair of oppositely charged particles, and in this pair, the black particles are the high positive particles and the yellow particles are the high negative particles. The red particles (R) and the white particles (W) are the second pair of oppositely charged particles and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles.

In addition, the color states of the four types of particles may be intentionally mixed. For example, because yellow pigment, by nature, often has a greenish tint and if a better yellow color state is desired, yellow particles along with red particles may be used where both types of particles carry the same charge polarity and the yellow particles are higher charged than the red particles. As a result, at the yellow state, there will be a small amount of the red particles mixed with the yellow particles, which red particles neutralize the greenish tint leading to a yellow state of better color purity.

It is understood that the scope of the invention broadly encompasses particles of any colors as long as the four types of particles have visually distinguishable colors.

For the white particles, they may be formed from an inorganic pigment, such as $TiO_2$, $ZrO_2$, ZnO, $Al_2O_3$, $Sb_2O_3$, $BaSO_4$, $PbSO_4$ or the like.

For the black particles, they may be formed from CI pigment black 26 or 28 or the like (e.g., manganese ferrite black spinel or copper chromite black spinel) or carbon black.

Particles of non-white and non-black colors are independently of a color such as red, green, blue, magenta, cyan or yellow. The pigments for color particles may include, but are not limited to, CI pigment PR 254, PR122, PR149, PG36, PG58, PG7, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

The color particles may also be inorganic pigments, such as red, green, blue and yellow. Examples may include, but are not limited to, CI (color index) pigment blue 36 or 28 (PB36 or PB28), CI pigment yellow 227 or 53, CI pigment green 50 or 26, CI pigment red 102, and the like.

The pigment particles may be encapsulated or polymer-coated, prepared by methods known in the art.

In addition to the colors, the four types of particles may have other distinct optical characteristics, such as optical transmission, reflectance, luminescence or, in the case of displays intended for machine reading, pseudo-color in the sense of a change in reflectance of electromagnetic wavelengths outside the visible range.

A display layer utilizing the display fluid of the present invention has two surfaces, a first surface (13) on the viewing side and a second surface (14) on the opposite side of the first surface (13). The display fluid is sandwiched between the two surfaces. On the side of the first surface (13), there is a common electrode (11) which is a transparent electrode layer (e.g., ITO), spreading over the entire top of the display layer. On the side of the second surface (14), there is an electrode layer (12) which comprises a plurality of pixel electrodes (12a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

Each space between two dotted vertical lines in FIG. 1 denotes a pixel or a sub-pixel. As shown, each pixel or sub-pixel has a corresponding pixel electrode. An electric field is created for a pixel by the potential difference between a voltage applied to the common electrode and a voltage applied to the corresponding pixel electrode.

The percentages of the four types of particles in the fluid may vary. For example, in a fluid having black/yellow/red/white particles, the black particle may take up 0.1% to 10%, preferably 0.5% to 5%, by volume of the electrophoretic fluid; the yellow particle may take up 1% to 50%, preferably 5% to 15%, by volume of the fluid; and each type of the red and white particles may take up 2% to 20%, preferably 4% to 10%, by volume of the fluid.

The solvent in which the four types of particles are dispersed is clear and colorless. It preferably has a low viscosity and a dielectric constant in the range of about 2 to about 30, preferably about 2 to about 15 for high particle mobility. Examples of suitable dielectric solvent include hydrocarbons such as Isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly (perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

In one embodiment, the charge (i.e., intensity or magnitude) carried by the "low charge" particles may be less than about 50%, preferably about 5% to about 30%, of the charge carried by the "high charge" particles. In another embodiment, the charge carried by the "low charge" particles may be less than about 75%, or about 15% to about 55%, of the charge carried by the "high charge" particles. In a further embodiment, the comparison of the charge levels as indicated applies to two types of particles having the same charge polarity. Therefore, the charge differentials indicated above may be separately applied to the two pairs of high-low charged particles in the same medium. For example, the magnitude of the low positive particles may be less than 75% of the magnitude of the high positive particles and the magnitude of the low negative particles may be less than 50% of the magnitude of the high negative particles.

The magnitudes of the "high positive" particles and the "high negative" particles may be the same or different. Likewise, the magnitudes of the "low positive" particles and the "low negative" particles may be the same or different.

It is also noted that in the same fluid, the two pairs of high-low charge particles may have different levels of charge differentials. For example, in one pair, the low positively charged particles may have a charge intensity which is 30% of the charge intensity of the high positively charged particles and in another pair, the low negatively charged particles may have a charge intensity which is 50% of the charge intensity of the high negatively charged particles.

The charge intensity may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

It is also noted that the four types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

The following is an example illustrating the present invention.

Example 1

Figure 2:
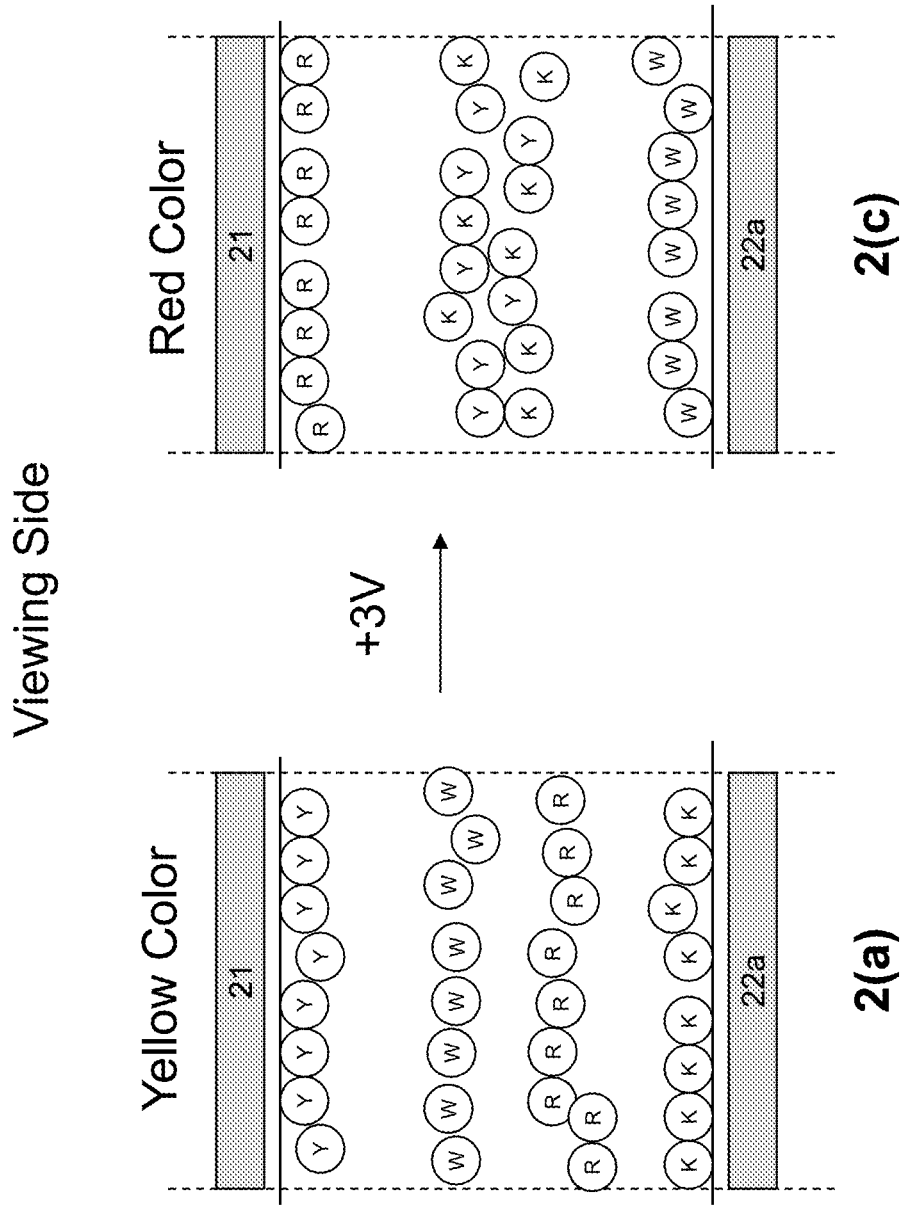

This example is demonstrated in FIG. 2. The high positive particles are of the black color (K); the high negative particles are of a yellow color (Y); the low positive particles are of a red color (R); and the low negative particles are of a white color (W).

In FIG. 2(a), when a high negative voltage potential difference (e.g., −15V) is applied to a pixel for a time period of sufficient length, an electric field is generated to cause the yellow particles (Y) to be pushed to the common electrode (21) side and the black particles (K) pulled to the pixel electrode (22a) side. The red (R) and white (W) particles, because they carry weaker charges, move slower than the higher charged black and yellow particles and as a result, they stay in the middle of the pixel, with white particles above the red particles. In this case, a yellow color is seen at the viewing side.

In FIG. 2(b), when a high positive voltage potential difference (e.g., +15V) is applied to the pixel for a time period of sufficient length, the positive voltage potential difference causes the particle distribution to be opposite of that shown in FIG. 2(a) and as a result, a black color is seen at the viewing side.

In FIG. 2(c), when a lower positive voltage potential difference (e.g., +3V) is applied to the pixel of FIG. 2(a) (that is, driven from the yellow state) for a time period of sufficient length, an electric field is generated to cause the yellow particles (Y) to move towards the pixel electrode (22a) while the black particles (K) move towards the common electrode (21). However, when they meet in the middle of the pixel, they slow down significantly and remain there because the electric field generated by the low driving voltage is not strong enough to overcome the strong attraction between them. On the other hand, the electric field generated by the low driving voltage is sufficient to separate the weaker charged white and red particles to cause the low positive red particles (R) to move all the way to the common electrode (21) side (i.e., the viewing side) and the low negative white particles (W) to move to the pixel electrode (22a) side. As a result, a red color is seen. It is also noted that there are also attraction forces between weaker charged particles (e.g., R) with stronger charged particles of opposite polarity (e.g., Y). However, these attraction forces are not as strong as the attraction forces between two types of stronger charged particles (K and Y) and therefore they can be overcome by the electric field generated by the low driving voltage. In other words, weaker charged particles and the stronger charged particles of opposite polarity can be separated.

In FIG. 2(d), when a lower negative voltage potential difference (e.g., −3V) is applied to the pixel of FIG. 2(b) (that is, driven from the black state) for a time period of sufficient length, an electric field is generated which causes the black particles (K) to move towards the pixel electrode (22a) while the yellow particles (Y) move towards the common electrode (21). When the black and yellow particles meet in the middle of the pixel, they slow down significantly and remain there because the electric field generated by the low driving voltage is not sufficient to overcome the strong attraction between them. At the same time, the electric field generated by the low driving voltage is sufficient to separate the white and red particles to cause the low negative white particles (W) to move all the way to the common electrode side (i.e., the viewing side) and the low positive red particles (R) move to the pixel electrode side. As a result, a white color is seen. It is also noted that there are also attraction forces between weaker charged particles (e.g., W) with stronger charged particles of opposite polarity (e.g., K). However, these attraction forces are not as strong as the attraction forces between two types of stronger charged particles (K and Y) and therefore they can be overcome by the electric field generated by the low driving voltage. In other words, weaker charged particles and the stronger charged particles of opposite polarity can be separated.

Although in this example, the black particles (K) is demonstrated to carry a high positive charge, the yellow particles (Y) carry a high negative charge, the red (R) particles carry a low positive charge and the white particles (W) carry a low negative charge, in practice, the particles carry a high positive charge, or a high negative charge, or a low positive charge or a low negative charge may be of any colors. All of these variations are intended to be within the scope of this application.

It is also noted that the lower voltage potential difference applied to reach the color states in FIGS. 2(c) and 2(d) may be about 5% to about 50% of the full driving voltage potential difference required to drive the pixel from the color state of high positive particles to the color state of the high negative particles, or vice versa.

The electrophoretic fluid as described above is filled in display cells. The display cells may be microcells as described in U.S. Pat. No. 6,930,818, the content of which is incorporated herein by reference in its entirety. The display cells may also be other types of micro-containers, such as microcapsules, micro-channels or equivalents, regardless of their shapes or sizes. All of these are within the scope of the present application.

Figures 2, 3:
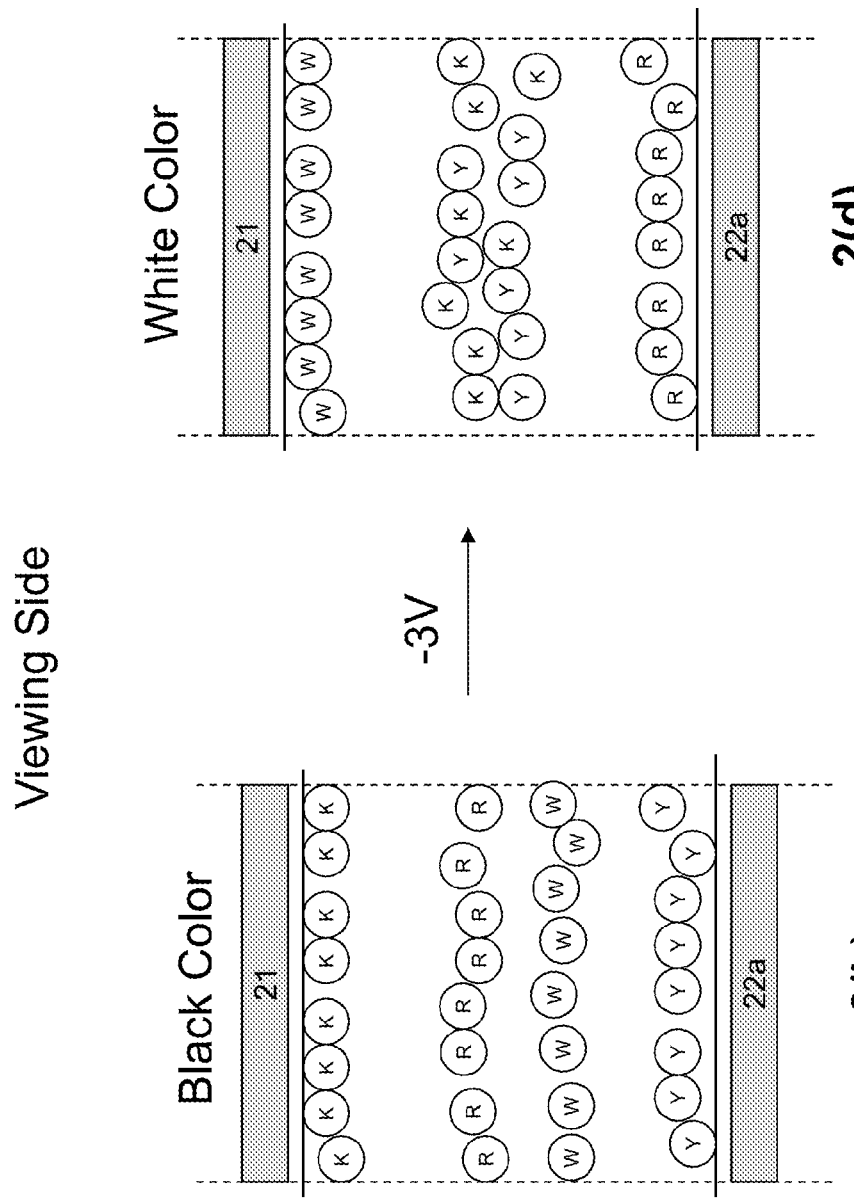

As shown in FIG. 3, the display cells (30), in the present invention, and the pixel electrodes (32a) do not have to be aligned.

Ideally when a high positive driving voltage (e.g. +15V) is applied as shown in FIG. 2(b), the electric field generated would cause the high positive black particles to move towards the common electrode side (i.e., the viewing side) and the high negative yellow particles and the low negative white particles to move towards the non-viewing side. The low positive red particles would move towards the viewing side. But since the red particles carry a lower charge compared to the black particles, they move slower and as a result, the black color is seen at the viewing side. However, in practice, the black state achieved may have a reddish tint. This could be caused by some of the red particles becoming mixed with the black particles at the viewing side.

The present invention also provides driving methods which can resolve the unsatisfactory color issue. In one of the driving methods, a pixel is first driven towards the color state of one of the low charged particles before being driven towards the color state of high charged particles, wherein the low charged particles and the high charged particles carry opposite charge polarities.

For example, a pixel may be driven towards the black color state, according to the following steps:
 a) driving first to the color state of the white particles (low negative charged) by applying a low negative driving voltage; and
 b) driving towards the color state of the black particles (high positive charged) by applying a high positive driving voltage.

This driving sequence is illustrated in FIG. 4A.

In step (a), once at the white state (e.g., FIG. 2(d)), the two types of "high charged" particles, black and yellow, will attract to each other to cause them to stay in the middle of the pixel and the low positive charged red pigment particles would move to be near or at the pixel electrode.

In step (b), the white and yellow particles are pushed to the pixel electrode side, and the low positive charged red particles are much less likely to show up at the viewing side. This sequence will result in a better quality of the black state.

In this driving method, a white color state is driven directly towards the black state without going through the red or yellow color state. It has also been found that higher the quality of the white state in step (a) will lead to a higher quality of the black state in step (b). The "higher quality of the white state" simply means a high L* value and low a* and b* values in the L*a*b* color system, for the white state.

A similar driving method may be applied to driving a pixel to the yellow state. The method will have the following steps:
 a) driving first to the color state of the red particles (low positive charged) by applying a low positive driving voltage; and
 b) driving towards the color state of the yellow particles (high negative charged) by applying a high negative driving voltage.

Figure 4B:
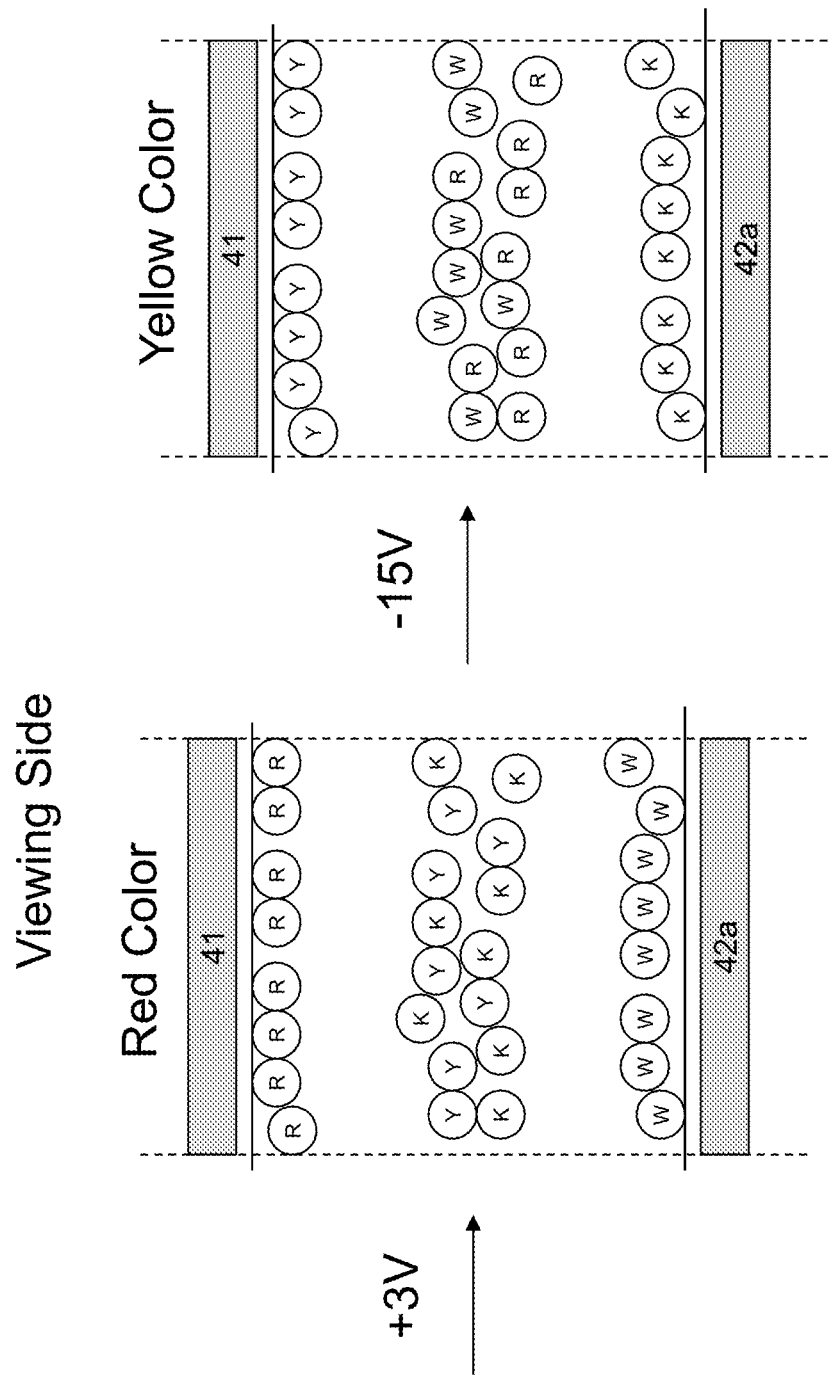

This driving sequence is shown in FIG. 4B.

In this driving method, a red color state is driven directly towards the yellow state without going through the white or black color state. It has also been found that higher the quality of the red state in step (a) will lead to a higher quality of the yellow state in step (b). The "higher quality of the red state" simply means a high a* value in the L*a*b* color system, for the red state.

In addition, to ensure both color brightness and color purity, a shaking waveform, prior to driving from one color state to another color state, may be used. The shaking waveform consists of repeating a pair of opposite driving pulses for many cycles. For example, the shaking waveform may consist of a +15V pulse for 20 msec and a −15V pulse for 20 msec and such a pair of pulses is repeated for 50 times. The total time of such a shaking waveform would be 2000 msec (see FIG. 5).

In practice, there may be at least 10 repetitions (i.e., ten pairs of positive and negative pulses).

The shaking waveform may be applied regardless of the optical state (e.g., black, white, red or yellow) prior to a driving voltage is applied. After the shaking waveform is applied, the optical state would not be a pure white, pure black, pure yellow or pure red. Instead, the color state would be from a mixture of the four types of pigment particles.

Each of the driving pulse in the shaking waveform is applied for not exceeding 50% (or not exceeding 30%, 10% or 5%) of the driving time required from the full black state to the full yellow state or vice versa in the example. For example, if it takes 300 msec to drive a display device from a full black state to a full yellow state or vice versa, the shaking waveform may consist of positive and negative pulses, each applied for not more than 150 msec. In practice, it is preferred that the pulses are shorter.

In one embodiment, a shaking waveform may be optionally applied prior to the driving sequence of FIG. 4A or FIG. 4B.

For example, a pixel may be:
(i) applied a shaking waveform;
(ii) driven to black (i.e., the first-time black state);
(iii) driven to white; and then
(iv) driven to black (i.e., the second-time black state).

In this sequence, step (ii) may be carried out according to FIG. 2(*b*); step (iii) may be carried out according to FIG. 2(*d*); and step (iv) may be carried out according to FIG. 4A.

Figure 6A:
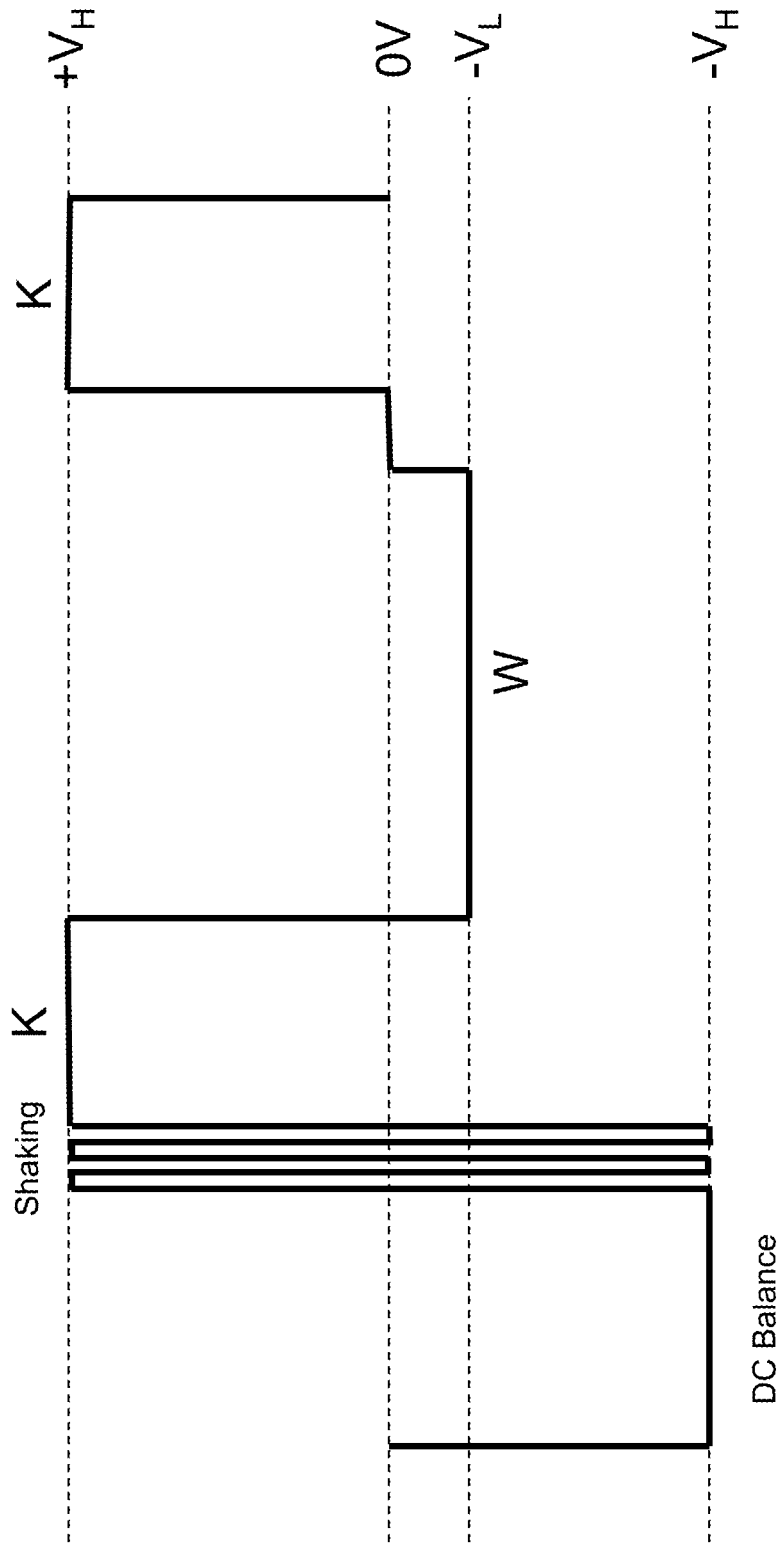
FIGS. 6A and 6B show example waveforms for driving the display device of the present invention.

An example waveform for this driving sequence is shown in FIG. 6A. In any of the driving sequences of the present invention, the waveforms are preferably DC balanced, that is, the average voltage applied across the display is substantially zero when integrated over a time period. In FIG. 6A, in the initial step as shown, a high negative driving voltage is applied to ensure DC balance of the entire waveform.

Similarly, a pixel may be:
(i) applied a shaking waveform;
(ii) driven to yellow (i.e., the first-time yellow state);
(iii) driven to red; and then
(iv) driven to yellow (i.e., the second-time yellow state).

In this sequence, step (ii) may be carried out according to FIG. 2(*a*); step (iii) may be carried out according to FIG. 2(*c*); and step (iv) may be carried out according to FIG. 4B.

Figure 6B:
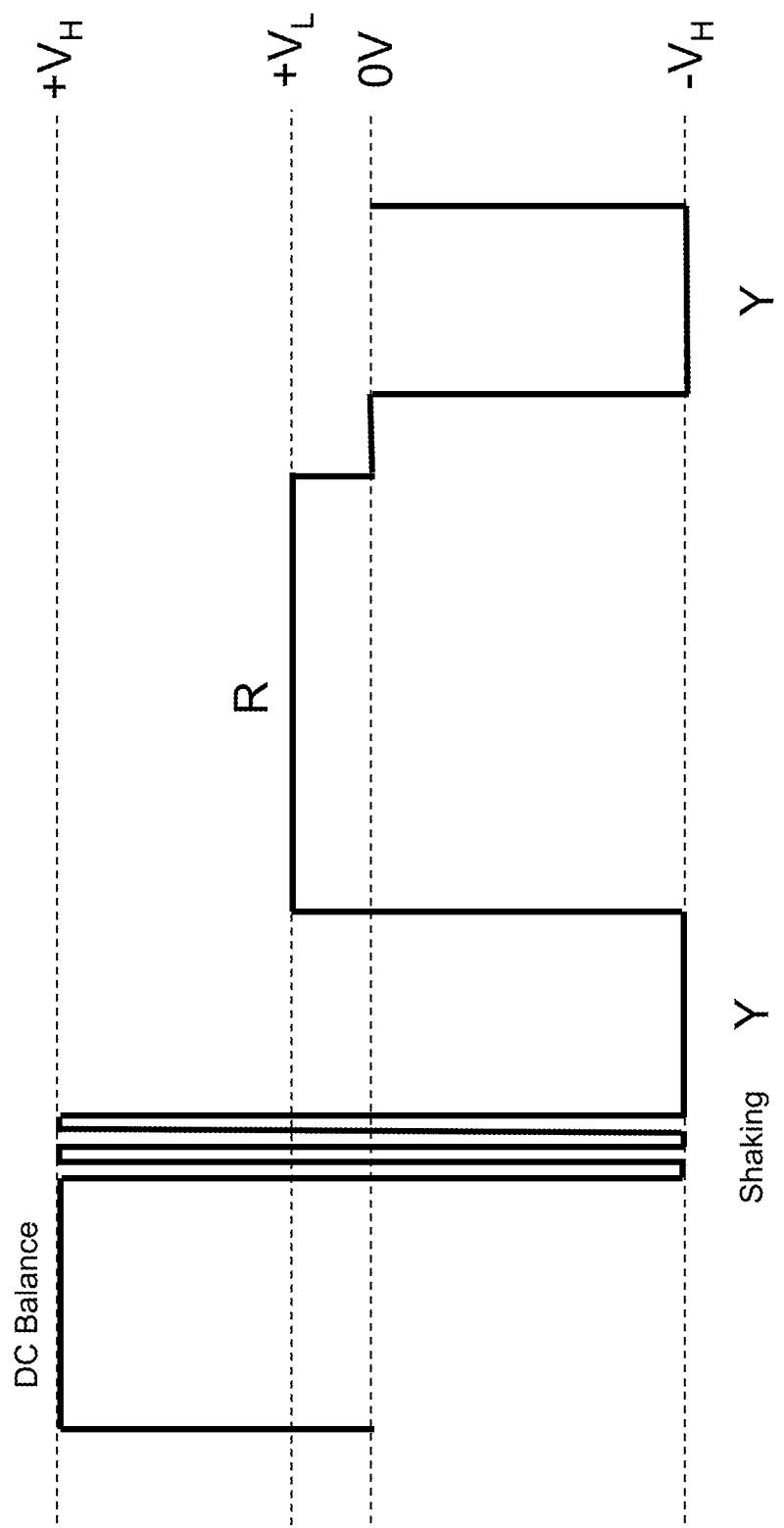

An example waveform for this driving sequence is shown in FIG. 6B, which is also "DC balanced".

In practice, the quality of the first-time color state (black or yellow) is usually inferior compared with the second-time color state (black or yellow).

In a further aspect of the present invention, each pixel may consist of two sub-pixels. Each sub-pixel can display four different color states, from a display fluid comprising four types of particles dispersed in a solvent or solvent mixture, and the four types of particles are black particles and three types of non-black particles of different colors. In addition, as described above, the four types of particles are high positive particles, high negative particles, low positive particles and low negative particles, respectively. Furthermore, among the six types of non-black particles between the two sub-pixels, there are at least four different colors.

The four different color states of each sub-pixel are displayed, according to the driving schemes described above.

In one embodiment, the six types of non-black particles between the two sub-pixels have six different colors. For example, the six colors may be red, green, blue, cyan, magenta and yellow, respectively. An example of this embodiment is illustrated in FIGS. 7A and 7B.

Figure 7A:
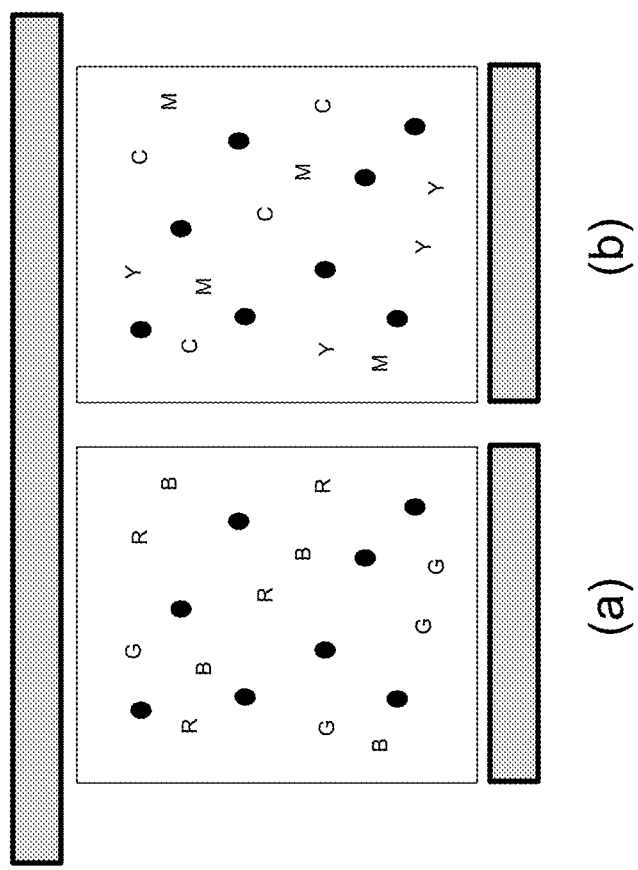

As shown in FIG. 7A, there are two sub-pixels (a) and (b) forming a pixel. In sub-pixel (a), the four types of particles are black, red (R), green (G) and blue (B), and therefore sub-pixel (a) can display four different color states, black, R, G and B. In sub-pixel (b), the four types of particles are black, cyan (C), magenta (M) and yellow (Y), and therefore sub-pixel (b) can display four different color states black, C, M and Y.

Figure 7B:
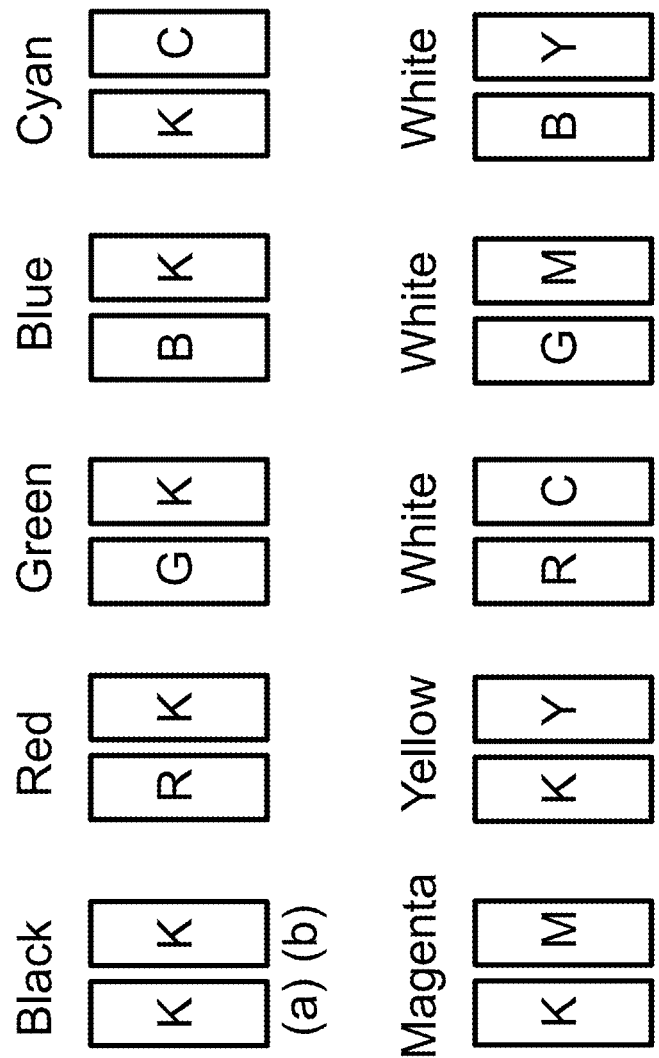

As shown in FIG. 7B, the pixel consisting of sub-pixel (a) and sub-pixel (b) may display a black color when both sub-pixels display the black color. The pixel may display a red, green, blue, cyan, magenta or yellow color when one sub-pixel displays the color of red, green, blue, cyan, magenta or yellow, and the other sub-pixel displays the black color. The pixel may display a white color, when sub-pixel (a) displays the red color and the sub-pixel (b) displays the cyan color, or when sub-pixel (a) displays the green color and the sub-pixel (b) displays the magenta color, or sub-pixel (a) displays the blue color and the sub-pixel (b) displays the yellow color.

In another embodiment, there are five different colors among the six types of non-black particles between the two sub-pixels. In other words, two types of the particles, one from each sub-pixel, have the same non-black color, preferably white. The remaining four types of particles have four different non-black colors. An example of this embodiment is illustrated in FIGS. 8A and 8B.

Figure 8A:
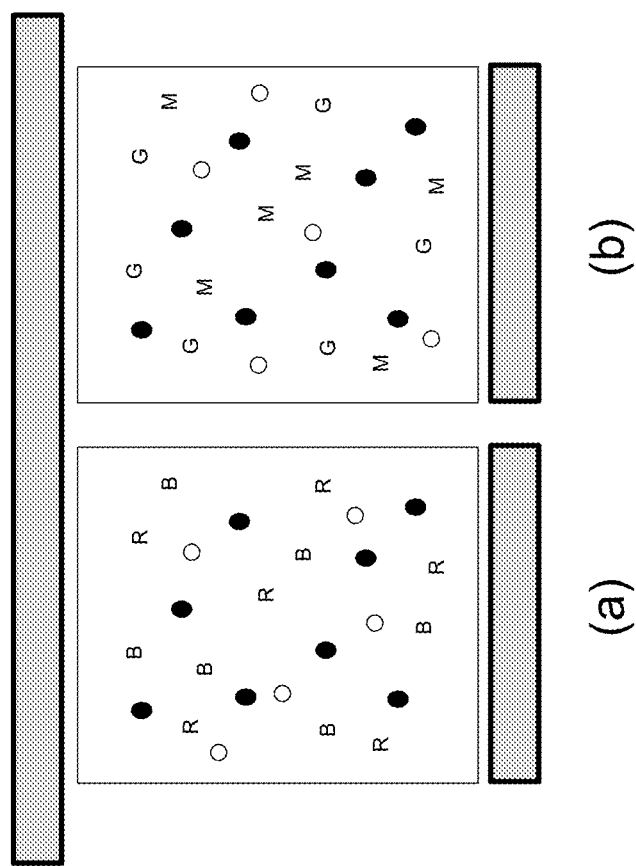

As shown in FIG. 8A, there are two sub-pixels (a) and (b) forming a pixel. In sub-pixel (a), the four types of particles are black, white, red (R) and blue (B), and therefore sub-pixel (a) can display four different color states, black, white, R and B. In sub-pixel (b), the four types of particles are black, white, green (G) and magenta (M), and therefore sub-pixel (b) can display four different color states black, white, G and M. In this example, among the six non-black particles, there are five different colors, white, red, blue, green and magenta.

As shown in FIG. 8B, the pixel consisting of sub-pixel (a) and sub-pixel (b) may display a black color when both sub-pixels display the black color. The pixel may display a white color when both sub-pixels display the white color. The pixel may display a red, blue, green or magenta color when one sub-pixel displays the color of red, blue, green or magenta, and the other sub-pixel displays the black color. The pixel may display a cyan color when sub-pixel (a) displays the blue color and the sub-pixel (b) displays the green color. The pixel may display a yellow color when sub-pixel (a) displays the red color and sub-pixel (b) displays the green color.

In a further embodiment, there are four different colors among the six non-black particles between the two sub-pixels. In other words, one set of two types of the particles, one from each sub-pixel, have the same non-black color, preferably white and another set of two types of particles, one from each sub-pixel have the same color. The remaining two types of particles have two different non-black colors. An example of this embodiment is illustrated in FIGS. 9A and 9B.

Figure 9A:
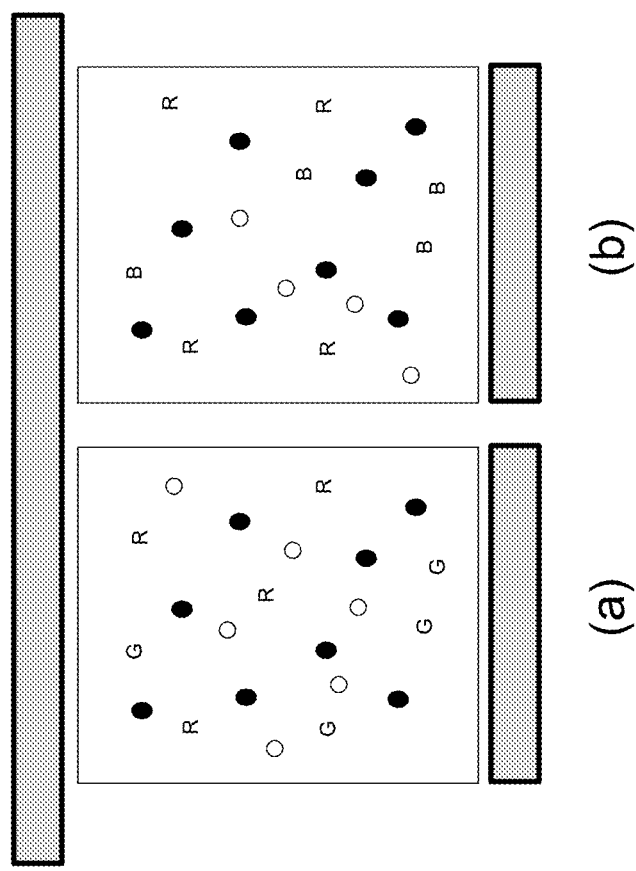

As shown in FIG. 9A, there are two sub-pixels (a) and (b) forming a pixel. In sub-pixel (a), the four types of particles are black, white, red (R) and green (G), and therefore sub-pixel (a) can display four different color states, black, white, R and G. In sub-pixel (b), the four types of particles are black, white, red (R) and blue (B), and therefore sub-pixel (b) can display four different color states black, white, R and B. In this example, among the six non-black particles, there are four different colors, white, red, green and blue.

Figure 9B:
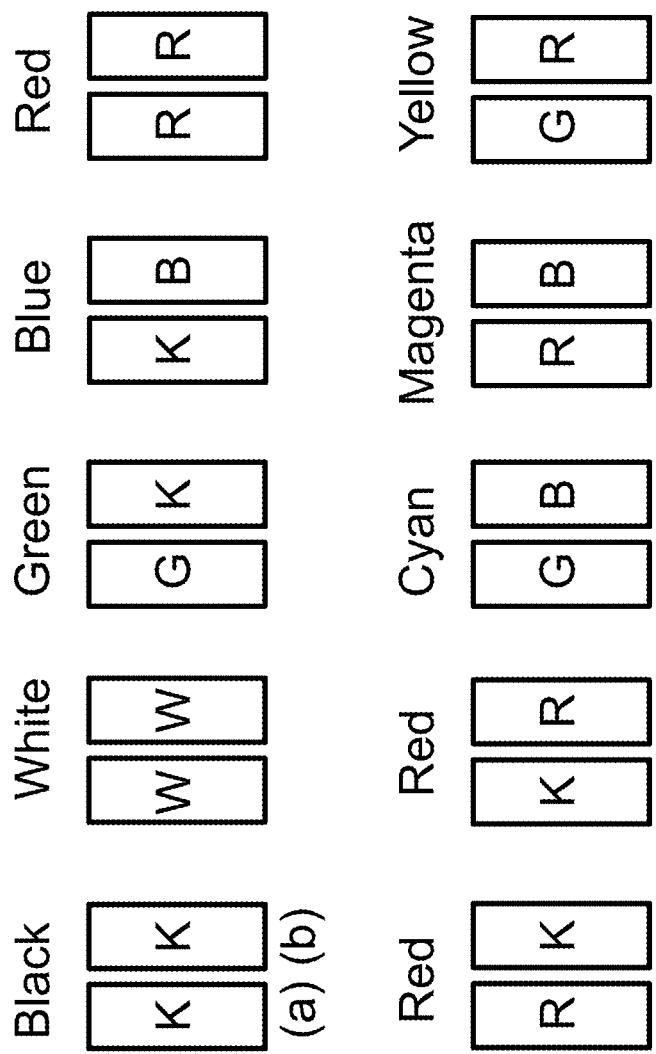

As shown in FIG. 9B, the pixel may display the black or white states while both sub-pixels display the black or white states. The pixel may display a green or blue color state while one sub-pixel displays the green or blue color state and the other sub-pixel displays the black state. The pixel may display a red color state while both sub-pixels display the red color states or one sub-pixel displays the red color state and the other sub-pixel displays the black color state. The pixel may display a cyan color while one sub-pixel (a) displays a green color and sub-pixel (b) displays a blue color. The pixel may display a magenta color while sub-pixel (a) displays a red color and sub-pixel (b) displays a blue color. The pixel may display a yellow color while sub-pixel (a) displays a green color and sub-pixel (b) displays a red color.

The advantage of this aspect of the invention is that multiple color states may be achieved with only four types of charged particles in a display medium, and therefore the display device has a higher switching speed. In addition, if there is a color state (e.g., red) the color intensity of which is weaker than other colors, the scheme of FIG. 9 may be followed, in which the red color may be enhanced while both sub-pixels display the red color.

In a further aspect of the present invention, the fluid comprising four types of charged pigment particles may further comprise substantially uncharged neutral buoyancy particles.

The term "substantially uncharged" refers to the particles which are either uncharged or carry a charge magnitude which is less than 5% of the average charge magnitude carried by the higher charged particles. In one embodiment, the neutral buoyancy particles are non-charged.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

The concentration of the substantially uncharged neutral buoyancy particles in the display fluid is preferably in the range of about 0.1 to about 10% by volume, more preferably in the range of about 0.1 to about 5% by volume.

The term "about" refers to a range which is ±10% of the indicated value.

The substantially uncharged neutral buoyancy particles may be formed from a polymeric material. The polymeric material may be a copolymer or a homopolymer.

Examples of the polymeric material for the substantially uncharged neutral buoyancy particles may include, but are not limited to, polyacrylate, polymethacrylate, polystyrene, polyaniline, polypyrrole, polyphenol and polysiloxane. Specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) and poly(benzyl methacrylate).

More preferably, the substantially uncharged neutral buoyancy particles are formed from a polymer which is not soluble in the solvent of the display fluid, and also has a high refractive index. In one embodiment, the refractive index of the substantially uncharged neutral buoyancy particles is different from that of the solvent or solvent mixture in which the particles are dispersed. However, typically the refractive index of the substantially uncharged neutral buoyancy particles is higher than that of the solvent or solvent mixture. In some cases, the refractive index of the substantially uncharged neutral buoyancy particles may be above 1.45.

In one embodiment, the materials for the substantially uncharged neutral buoyancy particles may comprise an aromatic moiety.

The substantially uncharged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersant preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22), Another type of suitable dispersants is polyethylene macromonomers, as shown below:

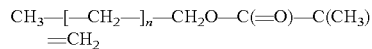

The backbone of the macromonomer may be a polyethylene chain and the integer "n" may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the substantially uncharged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher, or the like.

In the case of core-shell substantially uncharged neutral buoyancy particles, they may be formed by a microencapsulation method, such as coacervation, interfacial polycondensation, interfacial cross-linking, in-suit polymerization or matrix polymerization.

The size of the substantially uncharged neutral buoyancy particles is preferably in the range of about 100 nanometers to about 5 microns.

In one embodiment of this aspect of the present invention, the substantially uncharged neutral buoyancy particles added to the fluid may have a color substantially the same visually to the color of one of the four types of charged particles. For example, in a display fluid, there may be charged black, yellow, red and white particles and substantially uncharged neutral buoyancy particles, and in this case, the substantially uncharged neutral buoyancy particles may be black, yellow, red or white.

In another embodiment, the substantially uncharged neutral buoyancy particles may have a color substantially different from the color of either one of the four types of charged particles.

The presence of the substantially uncharged neutral buoyancy particles in the fluid increases reflection of incident light, thus also improving the contrast ratio, especially if they are formed from a reflective material.

The image stability may also be improved by the addition of the substantially uncharged neutral buoyancy particles in the four particle fluid system. The substantially uncharged neutral buoyancy particles can fill in the gaps resulted from the charged particles being over packed on the surface of an electrode under an electrical field, thus preventing the charged particles from settling due to the gravitational force.

In addition, if the substantially uncharged neutral buoyancy particles are white, they may enhance the reflectivity of the display. If they are black, they may enhance the black color displayed.

In any case, the substantially uncharged neutral buoyancy particles do not affect the driving behavior of the four types of charged particles in the fluid.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display layer comprising an electrophoretic medium and having a first surface on a viewing side and a second surface on the opposite side of the viewing side, wherein the electrophoretic medium is sandwiched between a common electrode and a layer of pixel electrodes and comprises high positively charged particles, high negatively charged particles, low positively charged particles, and low negatively charged particles, all dispersed in a solvent or solvent mixture, the four type of particles having respectively optical characteristics differing from one another, such that:
   (a) application of a high positive voltage potential difference between the common electrode and a pixel electrode will cause a pixel corresponding to the pixel electrode to display the optical characteristics of the high positively charged particles at the viewing side; or
   (b) application of a high negative voltage potential difference between the common electrode and a pixel electrode will cause a pixel corresponding to the pixel electrode to display the optical characteristic of the high negatively charged particles at the viewing side; or
   (c) once the optical characteristic of the high positively charged particles is displayed at the first surface, application of a low negative voltage potential difference between the common electrode and a pixel electrode will cause a pixel corresponding to the pixel electrode to display the optical characteristic of the low negatively charged particles at the viewing side and move the low positively charged particles to the pixel electrode side; or
   (d) once the optical characteristic of the high negatively charged particles is displayed at the first surface, application of a low positive voltage potential difference between the common electrode and a pixel electrode will cause a pixel corresponding to the pixel electrode to display the optical characteristic of the low positively charged particles at the viewing side and move the low negatively charged particles to the pixel electrode side.

2. The layer of claim 1, wherein the magnitude of the low charged particles is less than 50% of the magnitude of the high charged particles.

3. The layer of claim 1, wherein the magnitude of the low charged particles is less than 75% of the magnitude of the high charged particles.

4. The layer of claim 1, wherein the low voltage potential difference applied is 5% to 50% of the high voltage potential difference applied.

5. The layer of claim 1, wherein the electrophoretic medium further comprising substantially uncharged neutral buoyancy particles.

6. The layer of claim 5, wherein the neutral buoyancy particles are non-charged.

7. An electrophoretic medium sandwiched between a common electrode on a viewing side and a layer of pixel electrodes, which medium comprises high positively charged particles, high negatively charged particles, low positively charged particles, and low negatively charged particles, all dispersed in a solvent or solvent mixture, and the four type of particles having respectively optical characteristics differing from one another, such that:
   (a) application of a high positive voltage potential difference between the common electrode and a pixel electrode will cause a pixel corresponding to the pixel electrode to display the optical characteristics of the high positively charged particles at the viewing side; or
   (b) application of a high negative voltage potential difference between the common electrode and a pixel electrode will cause a pixel corresponding to the pixel electrode to display the optical characteristic of the high negatively charged particles at the viewing side; or
   (c) once the optical characteristic of the high positively charged particles is displayed at the first surface, application of a low negative voltage potential difference between the common electrode and a pixel electrode will cause a pixel corresponding to the pixel electrode to display the optical characteristic of the low negatively charged particles at the viewing side and move the low positively charged particles to the pixel electrode side; or
   (d) once the optical characteristic of the high negatively charged particles is displayed at the first surface, application of a low positive voltage potential difference between the common electrode and a pixel electrode will cause a pixel corresponding to the pixel electrode to display the optical characteristic of the low positively charged particles at the viewing side and move the low negatively charged particles to the pixel electrode side.

8. The medium of claim 7, wherein the magnitude of the low charged particles is less than 50% of the magnitude of the high charged particles.

9. The medium of claim 7, wherein the magnitude of the low charged particles is less than 75% of the magnitude of the high charged particles.

10. The medium of claim 7, wherein the low voltage potential difference applied is 5% to 50% of the high voltage potential difference applied.

11. The medium of claim 7, wherein the electrophoretic medium further comprising substantially uncharged neutral buoyancy particles.

12. The medium of claim 11, wherein the neutral buoyancy particles are non-charged.

13. A driving method for a display device comprising an electrophoretic medium and having a first surface on a viewing side and a second surface on the opposite side of the viewing side, wherein the electrophoretic medium is sandwiched between a common electrode and a layer of pixel electrodes and comprises high positively charged particles, high negatively charged particles, low positively charged particles, and low negatively charged particles, all dispersed in a solvent or solvent mixture, the four type of particles having respectively optical characteristics differing from one another, which method comprises:
  (a) applying a high positive voltage potential difference between the common electrode and a pixel electrode to drive a pixel corresponding to the pixel electrode to display the optical characteristics of the high positively charged particles at the first surface; or
  (b) applying a high negative voltage potential difference between the common electrode and a pixel electrode to drive a pixel corresponding to the pixel electrode to display the optical characteristic of the high negatively charged particles at the first surface; or
  (c) once the optical characteristic of the high positively charged particles is displayed at the first surface, applying a low negative voltage potential difference between the common electrode and a pixel electrode to drive a pixel corresponding to the pixel electrode to display the optical characteristic of the low negatively charged particles at the viewing side and move the low positively charged particles to the pixel electrode side; or
  (d) once the optical characteristic of the high negatively charged particles is displayed at the first surface, applying a low positive voltage potential difference between the common electrode and a pixel electrode to drive a pixel corresponding to the pixel electrode to display the optical characteristic of the low positively charged particles at the viewing side and move the low negatively charged particles to the pixel electrode side.

14. The method of claim 13, wherein the low voltage potential difference applied is 5% to 50% of the high voltage potential difference applied.

15. A driving method for driving an electrophoretic medium comprising four types of charged pigment particles dispersed in a solvent or solvent mixture, wherein the four types of charged pigment particles are high positively charged pigment particles, high negatively charged pigment particles, low positively charged pigment particles and low negatively charged particles; the method comprises:
  (a) applying to a pixel a high driving voltage having the same polarity as one type of high charged pigment particles to drive the pixel to color state of the type of high charged pigment particles,
  (b) applying to the pixel a low driving voltage having the same polarity as one type of low charged pigment particles to drive the pixel to color state of the type of low charged pigment particles; and
  (c) applying a high driving voltage having the same polarity as the type of high charged pigment particles to drive to color state of the type of high charged pigment particles;
  wherein the high charged pigment particles of (a) and (c) and the low charged pigment particles of (b) are oppositely charged and the driving method is DC balanced.

16. The method of claim 15, further comprising a shaking waveform.

17. A display device comprising a plurality of pixels, wherein each pixel consists of two sub-pixels and each sub-pixel displays four different color states from a display medium of claim 7, wherein the four types of particles are black particles and three types of non-black particles and among the six non-black colors between the two sub-pixels there are at least four different colors.

18. The display device of claim 17, wherein among the six non-black colors between the two sub-pixels there are six different colors.

19. The display device of claim 17, wherein one pair of two types of non-black particles, one from each sub-pixel, have the same color, resulting in five different colors among the six non-black colors between the two sub-pixels.

20. The display device of claim 17, wherein one pair of two types of non-black particles, one from each sub-pixel, have the same color, another pair of two types of particles, one from each sub-pixel, have the same color, resulting in four different colors among the six non-black colors between the two sub-pixels.

* * * * *